United States Patent Office 3,775,445
Patented Nov. 27, 1973

3,775,445
SURFACE ACTIVE AGENTS
Stephen E. McGuire and Oliver C. Kerfoot, Ponca City, Okla., assignors to Continental Oil Company, Ponca City, Okla.
No Drawing. Filed Jan. 14, 1972, Ser. No. 217,943
Int. Cl. C07c *143/90*
U.S. Cl. 260—402                                          6 Claims

ABSTRACT OF THE DISCLOSURE

Novel surface active agents are provided having the general formula:

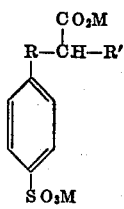

wherein R is a linear alkyl group containing from about 2 to 30 carbon atoms, R' is a linear alkyl group containing from about 1 to 30 carbon atoms, the sum of R plus R' being at least 9, and M is a cation selected from the group consisting of Li, Na, K, Rb, Cs, Ca, Mg, $NH_4$ and substituted ammonium.

BACKGROUND OF THE INVENTION

This application is a continuation-in-part of our earlier filed application U.S. Ser. No. 828,769, entitled, "Surface Active Agents," filed May 28, 1969.

FIELD OF THE INVENTION

This invention relates to surface active agents. In one aspect this invention relates to novel surface active agents containing 2 functional groups per molecule, namely, a carboxylate and a sulfonate moiety.

BRIEF DESCRIPTION OF THE PRIOR ART

Alkyl benzene sulfonates, e.g., dodecylbenzene sulfonate, have been known for many years to be excellent surface active agents, as have the alkali metal salts of fatty acids. However, in order to obtain the benefit of the sulfonate and the alkali metal carboxylate groups in a composition, it has been necessary to admix two different compounds, one containing the sulfonate group and the other containing the carboxylate group. Thus, it would be desirable to produce a surface active agent having both the sulfonate and carboxylate moiety in the same molecule. Earlier efforts to produce such surface agents have resulted in compounds containing both a sulfonate and a carboxylate moiety in the same compound, but with the carboxylate group being located in the terminal position in all cases. Such compounds fail to realize the highest potential inherent in the presence of both groups. Accordingly, much effort has been directed to preparing such compounds having improved properties.

OBJECTS OF THE INVENTION

An object of the invention is to provide a novel surface active agent. Another object of the invention is to provide a surface active agent containing a non-terminal carboxylate and a sulfonate group in one molecule. Another object of the invention is to provide a surface active agent wherein the sulfonate and said carboxylate groups are widely separated. These and other objects, advantages, and features of the present invention will become apparent to those skilled in the art from a reading of the following detailed disclosure and the appended claims.

SUMMARY OF THE INVENTION

According to the present invention novel surface active agents are provided having the general formula:

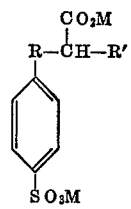

wherein R is a linear alkyl group containing from about 2 to 30 carbon atoms, R' is a linear alkyl group containing from about 1 to 30 carbon atoms, the sum of R plus R' being at least 9, and M is a cation selected from the group consisting of Li, Na, K, Rb, Cs, Ca, Mg, $NH_4$ and substituted ammonium. The phenyl group is distributed along the alkyl chain represented by R, but concentrated toward the end away from the carboxylate group.

DESCRIPTION OF PREFERRED EMBODIMENTS

The novel surface active agents of the present invention are those having the general formula:

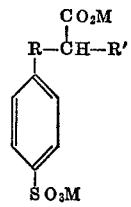

wherein R is a linear alkyl group containing from about 2 to 30 carbon atoms, R' is a linear alkyl group containing from about 1 to 30 carbon atoms, the sum of R plus R' being at least 9, and M is a cation selected from the group consisting of Li, Na, K, Rb, Cs, Ca, Mg, $NH_4$ and substituted ammonium. Suitable substituted ammonium cations are alkyl ammonium, such as methyl ammonium, dimethyl ammonium, and the like; and alkanol ammonium, such as monoethanol, diethanol, triethanol ammonium and the like. Particularly desirable results have been achieved wherein the cation used is selected from the group consisting of Na, K, $NH_4$, diethylammonium and diethanol ammonium. While any combination of linear alkyl groups can be employed as R and R', the only requirement being the sum of R and R' be at least 9, to provide the surface active properties of the composition, especially desirable results have been obtained wherein the sum of R and R' is between about 9 and 22 carbon atoms.

Suitable linear alkyl groups which can be employed as R in the formula described above are ethyl, propyl, butyl, pentyl, hexyl, heptyl, octyl, nonyl, decyl, dodecyl, tetradecyl, hexadecyl, octadecyl, icosyl, tetracosyl, octacosyl, nonacosyl, and triacontyl, and the like. Examples of suitable linear alkyl groups which can be employed as R' are methyl, ethyl, propyl, butyl, pentyl, hexyl, heptyl, octyl, nonyl, decyl, dodecyl, tetradecyl, hexadecyl, octadecyl, icosyl, tetracosyl, octacosyl, nonacosyl, triacontyl, and the like.

The term "surface active agent" as used in this specification is a compound which lowers the surface tension of water. It is well known that such surface active agents are employed in detergent formulations and are used as wetting agents to improve the wettability of substances.

Referring again to the formula M:

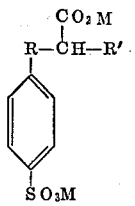

when R' is a linear alkyl group as described above, the carboxylate group is positioned at an internal position on the molecule, thus resulting in a sulfonated phenylalkanoic acid disodium salt having an internal carboxylate group. When the sulfonated phenylalkanoic acid disodium salt having an internal carboxylate group is formed, the sulfophenyl group and the carboxylate group are not randomly distributed throughout the molecule. Rather, the structure is one in which the sulfophenyl group is concentrated toward one end of the chain and the carboxylate group is concentrated toward the other end of the chain.

Such sulfonated phenylalkanoic acid salts having internal carboxylate groups have improved properties by comparison to similar compounds having carboxylate groups located in the terminal position (i.e., where R' above is hydrogen). The compounds having internal carboxylate groups offer an improved solubility in water and are thus more desirable for use in formulation of liquid detergents and the like. The improved solubility also results in a reduced tendency toward curd formation thus the internally carboxylated groups are better adapted to preparation of formulations for use in hard water. The compounds having internal carboxylate groups are also better foaming agents than similar groups having terminal carboxylate groups. While we do not wish to be bound by any particular theory it is believed that by positioning the sulfonate and carboxylate group in the internal portion of the molecule that a better hydrophilehydrophobe balance is achieved thus resulting in the improved properties. Numerous other advantages and differences will be obvious to those skilled in the art.

The sulfonated phenylalkanoic acid disodium salt having an internal carboxylate group of the present invention can be prepared by the following synthetic route. A straight chain olefin is subjected to the oxo reaction in the presence of an oxo catalyst at sufficient temperature and pressure to produce the primary alcohol corresponding to the starting olefin. The resulting primary alcohol has a considerable portion of the hydroxy functional group attached to a methylene group in an internal position. The primary alcohol is then subjected to caustic oxidation by employing equal molar ratios of the alcohol and the caustic at relatively high temperatures and pressures to make the sodium salt of the carboxylic acid. The sodium salt of the carboxylic acid is then treated with acid to recover the carboxylic acid corresponding to the original olefin. The carboxylic acid is then α-brominated to produce the α-bromocarboxylic acid via the Hell-Volhard-Zelinsky reaction. Benzene, the α-brominated carboxylic acid, is then alkylated in the presence of an alkylation catalyst under alkylation conditions which are well known in the art. The resulting alkylate is then sulfonated and neutralised to produce the desired sulfonated phenylalkanoic acid dimetal salt compound having an internal carboxylate. As is evident to those skilled in the art, any suitable sulfonating agent, such as sulfuric acid, oleum, and the like, can be employed. Likewise, any suitable alkali can be employed to neutralize the resulting sulfonated product. However, the amount of sulfonating and neutralizing agents and the reaction conditions will vary depending upon the particular sulfonating and neutralizing agents being employed.

In the preparation of the sulfonated phenylalkanoic acid dimetallic salt compounds of the present invention, the only criteria which must be considered in the preparation of such compounds is that the total carbon atoms represented by R plus R' in the before-described formula must be at least 9 to produce the desired surface active properties, and the sulfonate group must be attached to the phenyl group wherein the carboxylate group is attached to the linear alkyl portion formed by $$R-CH-R'$$

of the formula described hereinabove.

In order to more fully describe the surface active agents of the present invention the following specific example in the preparation and utilization of the novel surface active agents of the present invention is provided. However, it is to be understood that the following example is for illustrative purposes only and the limitations contained therein are not to be construed as unduly limiting the scope of the invention which will be defined in the claims hereinafter.

EXAMPLE

An experiment was conducted to produce a sulfonated phenylalkanoic acid disodium salt having an internal carboxylate. Fourteen hundred (1400 grams) of 1-dodecene and 100 ml. of n-hexane were charged to a 1-gallon autoclave through a vessel containing 6.8 grams of cobalt carbonyl. The n-hexane was prewashed with concentrated sulfuric acid, water and dried over $MgSO_4$. The reaction was run at 285 to 352° F. for 1½ hours. Gases formed during the reaction were vented as necessary to maintain 1800 to 3300 p.s.i. on the autoclave. After the reaction was completed, the contents of the autoclave were allowed to cool and then the contents were transferred to a 12-liter flask and refluxed 3 hours with 5% sulfuric acid. Small samples of the organic layer were withdrawn, dried over $Na_2SO_4$ and then analyzed for cobalt by X-ray fluorescence. No detectable cobalt was found in the organic layer so the aqueous layer was drawn off and the organic layer washed twice with water. After washing, the organic layer was dried by filtering through the diatomaceous earth. Infrared analysis of the clear resulting liquid showed hydroxyl —OH (3450 cm.$^{-1}$) and aldehyde carbonyl (1730 cm.$^{-1}$).

The clear liquid product (the oxo product) was then charged to a 1-gallon autoclave along with powdered copper chromite catalyst. Approximately 2058 grams, including some hexane, of the oxo product was employed and 300 grams of the powdered copper chromite catalyst. The hydrogenation of the oxo product was then conducted at 315 to 330° F. and at 3000 p.s.i. for 2½ hours. The resulting hydrogenation product was then withdrawn from the autoclave at the end of this period and filtered through diatomaceous earth to remove any suspended catalyst present in the hydrogenation product. The hexane present was removed by distillation through a 6-inch Vigreux column at atmospheric pressure. The remaining product was then vacuum distilled to recover an oxo alcohol. Infrared analysis verified a strong hydroxyl —OH (3350 cm.$^{-1}$) and only a trace of the aldehyde carbonyl (1730 cm.$^{-1}$). GLC of the acetate esters gave 92% purity of the isomeric $C_{13}$ alcohols.

The resulting oxo alcohols from the previous step were then subjected to caustic oxidation. Eight hundred and sixty-five (865) grams of the alcohol (4.7 moles) and 245 grams of sodium hydroxide (6.1 moles) were charged into a 1-gallon nickel autoclave. The resulting mixture was then heated at 600° F. and maintained at said temperature for a period of 4¼ hours. Hydrogen formed by the caustic oxidation of the alcohol was vented as necessary. At the end of the 4½ hour period the reactants were allowed to cool and the solid mass formed during the reaction was removed from the autoclave and placed into a 12-liter flask. A slurry was made from the solid mass by admixing about 6 liters of water with the solid mass. The slurry was stirred at 50 to 60° C. and acidified with about 600 ml. of concentrated hydrochloric acid. The acidified slurry was then poststirred for 1 hour following which the aqueous layer was drawn off and the organic layer washed with 4 liters of hot water. The organic phase was then vacuum distilled through a 6-inch Vigreux column. Infrared and GLC analyses indicated that the product was a high purity $C_{13}$ carboxylic acid having a majority of the isomers located at the internal position.

The $C_{13}$ oxo acids recovered above were then subjected to α-bromination. The procedure followed was that the bromine which was to be used was dried by shaking with an equal volume of concentrated sulfuric acid in a separatory funnel. The separated bromine was then added to a 2-liter flask containing the oxo acid. In this experiment 617 grams (3.85 moles) of bromine was employed and 761 grams (3.56 moles) of the oxo acid were employed. The flask containing the bromine and oxo acid was fitted with a thermometer, mechanical stirrer, dropping funnel, and 2 efficient condensers in series leading through a $CaCl_2$ drying tube which exited into a gas trap. Twelve (12) ml. of $PCl_3$ was then quickly added through the dropping funnel and the reactants were warmed to 80 to 85° C. Vigorous hydrogen bromine evolution occurred during this period. After 20 hours stirring at 80 to 85° C. the mixture was heated to 125 to 135° C. for 2 hours. At the completion of the 2-hour period the reaction mass was allowed to cool and a water aspirator vacuum was pulled to remove dissolved hydrogen bromide and bromine. The reaction product was then filtered through diatomaceous earth to remove the black, suspended polymeric solid present. The filtrate was a dark brown liquid weighing about 1013 grams and was determined to be the α-bromo $C_{13}$ acid.

The α-bromo $C_{13}$ acid was then alkylated with benzene in the presence of an alkylation catalyst in accordance with the following procedure. In a 5-liter flask fitted with mechanical stirrer, thermometer, dropping funnel and condenser with drying tube was placed 1621 grams of benzene and 535 grams (4.0 moles) of aluminum chloride. One thousand and five (1005) grams (3.45 moles) of the α-bromo acid was dissolved in 852 grams of benzene and the resulting solution was added dropwise into the flask over a 4½ hour period at 25 to 28° C. Vigorous hydrogen halide evolution occurred. The alkylation was followed by observing the drop in weight percent bromine by X-ray fluorescence.

The resulting alkylation product was then hydrolyzed by pouring the cooled reaction mixture onto ice and 900 ml. of concentrated HCl while stirring. The aqueous phase which formed was drawn off and extracted with benzene. The combined organic phases were then washed twice with water, once with brine, and filtered through diatomaceous earth. The benzene remaining in the organic phase was then removed by simple distillation to leave 893 grams of crude alkylation product. The crude alkylation product was then vacuum distilled through a 3-foot by 1-inch vacuum-jacketed column packed with glass helices. A sodium hydroxide trap was employed in the vacuum line to remove the hydrogen bromide present in the crude product. Sixty-three and one-half (63½) grams of liquid boiling at 190 to 203° C. at 0.70 to 1.40 mm.

Hg was obtained. I.R. confirmed the presence of carboxylic acid and the N.M.R. spectrum was compatible with the desired arylalkanoic acid. Mass spec indicated a parent ion peak at m./e. 290 as expected. The data clearly indicate that the compound formed was the phenyltridecanoic acid having internal carboxylate.

The phenyltridecanoic acid having internal carboxylate formed above was then sulfonated with oleum and neutralized with sodium hydroxide. Fifty-nine (59 grams) (0.20 mole) of the phenyltridecanoic acid was stirred vigorously in a 250 ml. creased flask fitted with a thermometer, dropping funnel with curved exit, a mechanical stirrer, and an opening to the air. Sixty-two (62) grams of fuming sulfuric acid was then added dropwise over a 30-min .period. An ice bath was required to maintain the temperature of the reaction mixture at 25° C. After the addition of the fuming sulfuric acid was completed, the reactants were warmed to 35° C. with a water bath and stirred for 1 hour. The water bath was then removed and the reactants stirred an additional hour. At this time, 25 ml. of water was added and the contents of the flask were warmed rapidly to 80° C. The contents were then transferred to a beaker and the pH adjusted to approximately 9 with a solution of sodium hydroxide and isopropyl alcohol which contained 85% isopropyl alcohol. The neutralized solution was then filtered to remove sodium sulfate and the solvent was evaporated off. A solid was then obtained which yielded 72 grams and the solid was then ground up into a powder. The resulting powder was then treated to remove unreacted phenylalkanoic acid. This procedure involved dissolution in aqueous isopropyl alcohol, acidification of the carboxylate group, extraction with hexane, neutralization of the carboxylate group, dilution with isopropyl alcohol to precipitate sodium sulfate, separation of sodium sulfate, and evaporation of solvent to recover a purified powder. The purified powder was then analyzed by N.M.R. and acid-base titration and determined to be the sulfophenyltridecanoic acid disodium salt. The product recovered from the sulfonation and neutralization steps was the sulfophenyltridecanoic acid disodium salt having an internal carboxylate of the present invention.

The data bove clearly indicates that the novel surface active compounds of the present invention which contain a sulfonate group attached to the phenyl ring and a carboxylate group internally attached to the linear alkyl group of the formula previously described can readily be prepared. Further, it is readily apparent that by incorporating both the carboxylate group and the sulfonate group into the same molecule that one can obtain surface active agents, the utility of which are well known to those skilled in the art.

Having thus described the invention, we claim:

1. A surface active agent having the general formula:

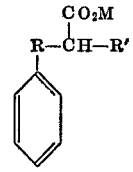

wherein R is a linear alkyl group containing from 2 to 30 carbon atoms, R' is a linear alkyl group containing from 1 to 30 carbon atoms, the sum of R plus R' is at least 9 and M is a cation selected from the group consisting of, Na, K, ammonium, methyl ammonium, dimethyl ammonium, diethyl ammonium, monoethanol ammonium, diethanol ammonium and triethanol ammonium.

2. The surface active agent of claim 1 wherein said R contains from 2 to 21 carbon atoms, R' contains from 1 to 21 carbon atoms and the sum of R+R' is equal to 9 to 22 carbon atoms.

3. The surface active agent of claim 1 wherein the sum of the carbon atoms in R+R' is 11 to 18.

4. The surface active agent of claim 1 wherein said M is a cation selected from the group consisting of Na, K, ammonium diethyl ammonium and diethanol ammonium.

5. The surface active agent of claim 1 wherein the sum of R+R' is 11 to 18 and said M is a cation selected from the group consisting of Na, K, $NH_4$ diethyl ammonium and diethanol ammonium.

6. The surface active agent of claim 1 wherein the sum of R+R' is 11 and said M is sodium.

References Cited

UNITED STATES PATENTS 2,716,126  8/1955  DeGroote _____ 260—402

ELBERT L. ROBERTS, Primary Examiner

U.S. Cl. X.R.

260—507